(12) United States Patent
Buch et al.

(10) Patent No.: US 10,043,543 B1
(45) Date of Patent: Aug. 7, 2018

(54) METHOD TO RE-CHARACTERIZE MECHANICAL COUPLING USED IN MULTIPLE-ACTUATOR SERVO COMPENSATION

(71) Applicant: Seagate Technology LLC, Cupertino, CA (US)

(72) Inventors: Bruce Douglas Buch, Westborough, MA (US); Mehmet Fatih Erden, St. Louis Park, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/844,767

(22) Filed: Dec. 18, 2017

(51) Int. Cl.
*G11B 21/02* (2006.01)
*G11B 5/596* (2006.01)

(52) U.S. Cl.
CPC .............. *G11B 5/59627* (2013.01)

(58) Field of Classification Search
CPC ... G11B 5/5578; G11B 5/556; G11B 5/59694; G11B 5/012; G11B 5/02; G11B 5/5552; G11B 5/5565; G11B 5/5582; G11B 5/6005; G11B 5/59633; G11B 5/54

USPC ........... 360/55, 69, 75, 77.01, 78.05, 78.12, 360/77.11, 77.05, 78.04
See application file for complete search history.

(56) References Cited

U.S. PATENT DOCUMENTS

| | | | |
|---|---|---|---|
| 6,560,075 B2 | 5/2003 | Price et al. | |
| 6,847,504 B1 | 6/2005 | Bennett et al. | |
| 6,975,477 B1 * | 12/2005 | Hu ...................... | G11B 5/5552 360/71 |
| 9,361,919 B1 | 6/2016 | Lieu et al. | |
| 2008/0123213 A1 | 5/2008 | Craig et al. | |

* cited by examiner

*Primary Examiner* — Nabil Hindi
(74) *Attorney, Agent, or Firm* — Hollingsworth Davis, LLC (57) ABSTRACT

In a device with first and second heads, the second head is held at a radial location over one or more disks via a second actuator that moves the second head. A position error of the second head is read while performing a seek with a first actuator, the first actuator moving the first head over the one or more disks. A mechanical transfer function is determined between the first actuator and the second actuator based on the position error of the second head. The mechanical transfer function is used to provide compensation for the second head via the second actuator in response to subsequent seek of the first actuator.

20 Claims, 6 Drawing Sheets

METHOD TO RE-CHARACTERIZE MECHANICAL COUPLING USED IN MULTIPLE-ACTUATOR SERVO COMPENSATION

SUMMARY

The present disclosure is directed to a method to re-characterize mechanical coupling used in multiple actuator servo compensation. In one embodiment, in a device with first and second heads, the second head is held at a radial location over one or more disks via a second actuator that moves the second head. A position error of the second head is read while performing a seek with a first actuator, the first actuator moving the first head over the one or more disks. A mechanical transfer function is determined between the first actuator and the second actuator based on the position error of the second head. The mechanical transfer function is used to provide compensation for the second head via the second actuator in response to subsequent seek of the first actuator.

In another embodiment, in response to positioning a first head over one or more disks via a first servo controller that drives a first actuator, a signal is sent to a second servo controller that indicates a reaction force due to the driving of the first actuator. Using the signal, compensation for the reaction force is attempted via the second servo controller when controlling a position of a second head over the one or more disks via a second actuator. Position errors at the second head are determined while attempting the compensation. Responsive to the position errors exceeding a threshold, a mechanical coupling between the first and second actuators is re-characterized using the first and second heads and the first and second actuators. Based on the re-characterization of the mechanical coupling, the compensation of the second actuator is modified via the second servo controller for subsequent operations.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Additional HDD features described herein, generally described as "parallelism" architectures are seen as a way to increase HDD performance measures such as IOPS and latency. Generally, parallelism architectures operate multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for multiple simultaneous random data access requests.

In embodiments described below, a hard disk drive includes multiple heads driven by the same or different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures is extended to other components that operate in the HDD, including system controllers, servo controllers, read/write channels, host interfaces, caches, etc.

In an HDD with multiple actuators, the movement of one of the actuators can interfere with the operation of the other actuator(s). The force exerted by an actuator can cause mechanical disturbance/vibration that affects other actuators. One example of forces intentionally exerted during normal operation include forces applied via a voice coil motor during seek acceleration and deceleration. These forces are most likely to impact the ability to track settle and track follow on the other actuator(s). For certain operations such as settling and following operations while writing, the constraints are tighter than other operations (e.g., reading) due to the possibility of destroying previously written data in adjacent tracks due to mistracking. If these operations are disturbed significantly, then the write operation will be delayed or suspended resulting in degraded performance.

In embodiments described below, a servo system controlling each actuator is made aware of the actuation commands issued by other servos controllers to their respective actuators. The servo controllers can proactively apply actuation to their own actuator to compensate for the anticipated inter-actuator coupling. One issue with this compensation is that the characteristics of inter-actuator coupling (e.g., as estimated by the mechanical transfer function between the actuators and heads) may change over time. The change in characteristics may be due to aging of mechanics, or a change in drive orientation, mounting conditions, or temperature, to name a few effects. To maintain performance, an apparatus described below includes features used to ascertain if the inter-actuator coupling compensation is degrading. In such a case, the apparatus can re-characterize the coupling to improve the effectiveness of the compensation as the drive ages.

Figure 1:
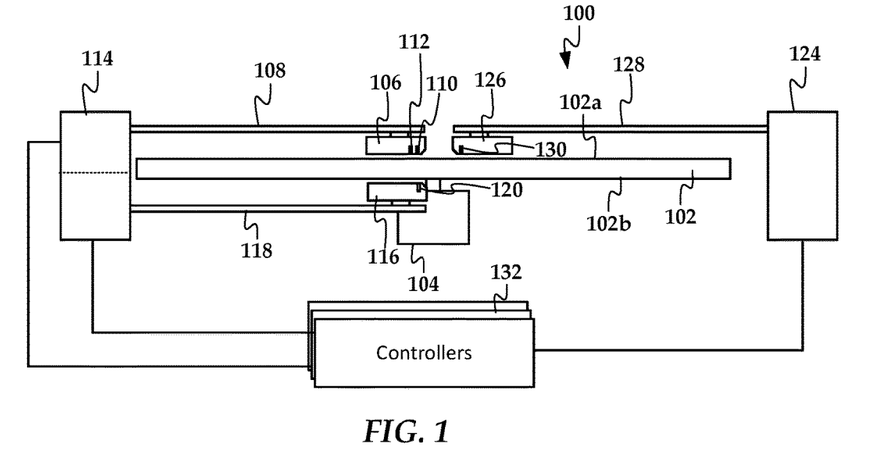
FIG. 1 is a diagram of an apparatus according to an example embodiment.

In FIG. 1, a diagram illustrates an apparatus 100 (e.g., data storage drive) with parallelism features according to example embodiments. The apparatus 100 includes at least one magnetic disk 102 driven by a spindle motor 104. A slider 106 (also referred to as a head, read/write head, read head, write head, recording head, etc.) is held over a first surface 102a of the disk 102 by an arm 108. An actuator 114 moves (e.g., rotates) the arm 108 to place the slider 106 over different tracks on the disk 102. The slider includes a read transducer 110 and/or a write transducer 112. The read transducer 110 provides a signal in response to changing magnetic fields on the disk 102, and is coupled to a controller (not shown) where the separate signals are independently processed. The write transducer 112 receives signals from the controller and converts them to magnetic fields that change magnetic orientations of regions on the disk 102.

The apparatus 100 includes a second slider 116 supported by a second arm 118. The second slider 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114 indicating a split actuator). In either configuration, the arms 108, 118 rotate around the same axis. The slider 116 also includes read and/or write transducers 120. The transducers 120 are capable of reading from and/or writing to disk surface 102b simultaneously with one or both of read/write transducers 110, 112 that access disk surface 102a.

In another embodiment, the apparatus 100 includes a third slider 126 supported by a third arm 128. The third slider 126 (and its associated actuation hardware) may be included instead of or in addition to the second slider 116. The third slider 126 is held over the first surface 102a of the disk 102 as a second actuator 124 causes the third arm 118 to move to different tracks on the disk 102. The arm 128 and actuator 124 move independently of arm 108 and actuator 114. The slider 126 includes read and/or write transducers 130. The transducers 130 are capable of reading from and/or writing to disk surface 102a simultaneously with transducers 110, 112 of first slider 106.

In the examples shown in FIG. 1, more than one disk 102 may be used, and the actuators 114, 124 may be coupled to additional arms and heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102a, 102b at the same time. Independently movable heads that utilize non-coaxial actuators 114, 124 may access the same surface at the same time, e.g., heads 106 and 126 may both access surface 102a at the same time, as well as accessing different surfaces at the same time.

One or more controllers 132 are coupled to the respective actuators 114, 124 and control movement of the actuators 114, 124. The controllers 132 may include systems on a chip that perform such operations as servo control, encoding and decoding of data written to and read from the disk 102, queuing and formatting host commands, etc. As pertains to the discussion below, the one or more controllers 132 have the ability to execute multiple media read/write operations concurrently.

Seek acceleration and deceleration of one actuator potentially disturbs operations on other actuator(s). The amount of disturbance may be unique for each actuator and vary based on the rate of acceleration and deceleration of the seeking actuator as well as other factors such as radial position of the heads when the disturbance occurs. The mechanical and electrical coupling between the actuators can affect both the magnitude and timing of the disturbances felt by each actuator. An example of how this coupling may be observed for a storage drive according to an example embodiment is shown in the graph of FIG. 2.

The top curve 200 represents an amplitude signal of an accelerometer that represents theoretical acceleration at a first actuator of a drive. The bottom curve 202 represents the theoretical amplitude signal of a second accelerometer coupled to a second actuator that is part of the same drive as the first actuator. For purposes of this example, it is assumed the second actuator is not moving, e.g., currently in tracking mode or parked. The first actuator is performing a seek, as indicated by peak 204 at the start of the seek and peak 206 at the end of the seek. Note that the direction of acceleration detected by an accelerometer would be different for the two seek operations, one being an acceleration of the actuator and the other being a deceleration. For purposes of simplification in this example, the absolute value of amplitude is being shown in the peaks 204, 206.

The accelerometer curve of the second actuator also exhibits peaks 208, 210 that are due to reaction forces caused by the seeking of the first actuator. These peaks 208, 210 may have a different amplitude, shape, and timing than peaks 204, 206 due to the properties of the components that physically (and in some cases electrically) couple the first and second actuator. The difference between the peaks 204, 206 and 208, 210 can be expressed as a transfer function or similar relation. By communicating digital or analog signals input to the first actuator that caused the peaks 204, 206, the second actuator can preemptively compensate (e.g., provide servo inputs to the second actuator or microactuators used with the second actuator) to ensure that any heads driven by the second actuator do not mistrack or are otherwise negatively affected.

Figure 2:
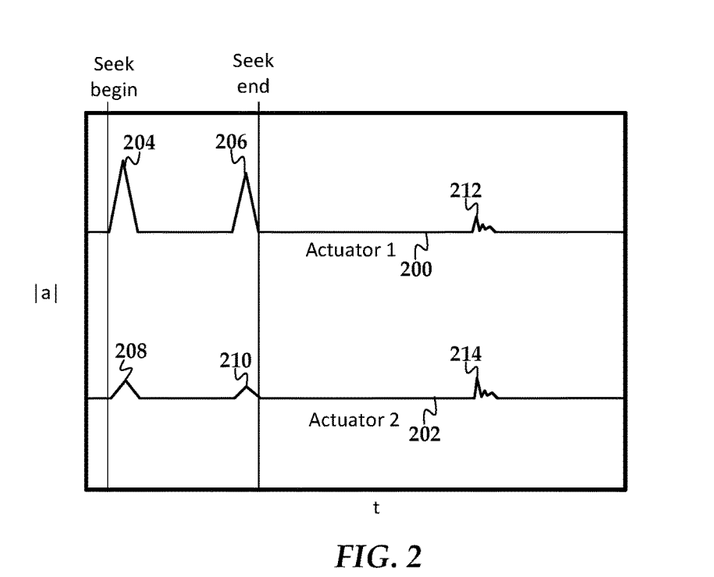
FIG. 2 is a graph showing cross-actuator disturbance coupling according to an example embodiment.

Also shown in FIG. 2 are peaks 212, 214 which are due to a mechanical (or electrical) input unrelated to the actuators. This could be an external shock applied to the case of the device, for example. The servo controllers for the first and second actuators will attempt to compensate for these peaks 212, 214 using existing disturbance rejection features, such as position error feedback. Unlike the movement of the first actuator shown in peaks 204, 206, this type of disturbance is unpredictable, and so cannot be proactively compensated for like the inter-actuator disturbances.

Note that the preemptive compensation for the operation of other actuators depends on the mechanical transfer function, e.g., between the first actuator and a head in the second actuator, in order to accurately characterize the local effects and determine if and what compensation may be needed. Such transfer function can be found during qualification testing, although the transfer function can change over time. Changes can be due to mechanical wear, change in material properties, ambient conditions, mounting structure/orientation, absorption of moisture, etc. If the changes are significant, compensation for expected disturbances from other actuators may cause more harm than good, or at least not as well as required for acceptable drive performance, if old transfer functions are relied upon.

Figure 3:
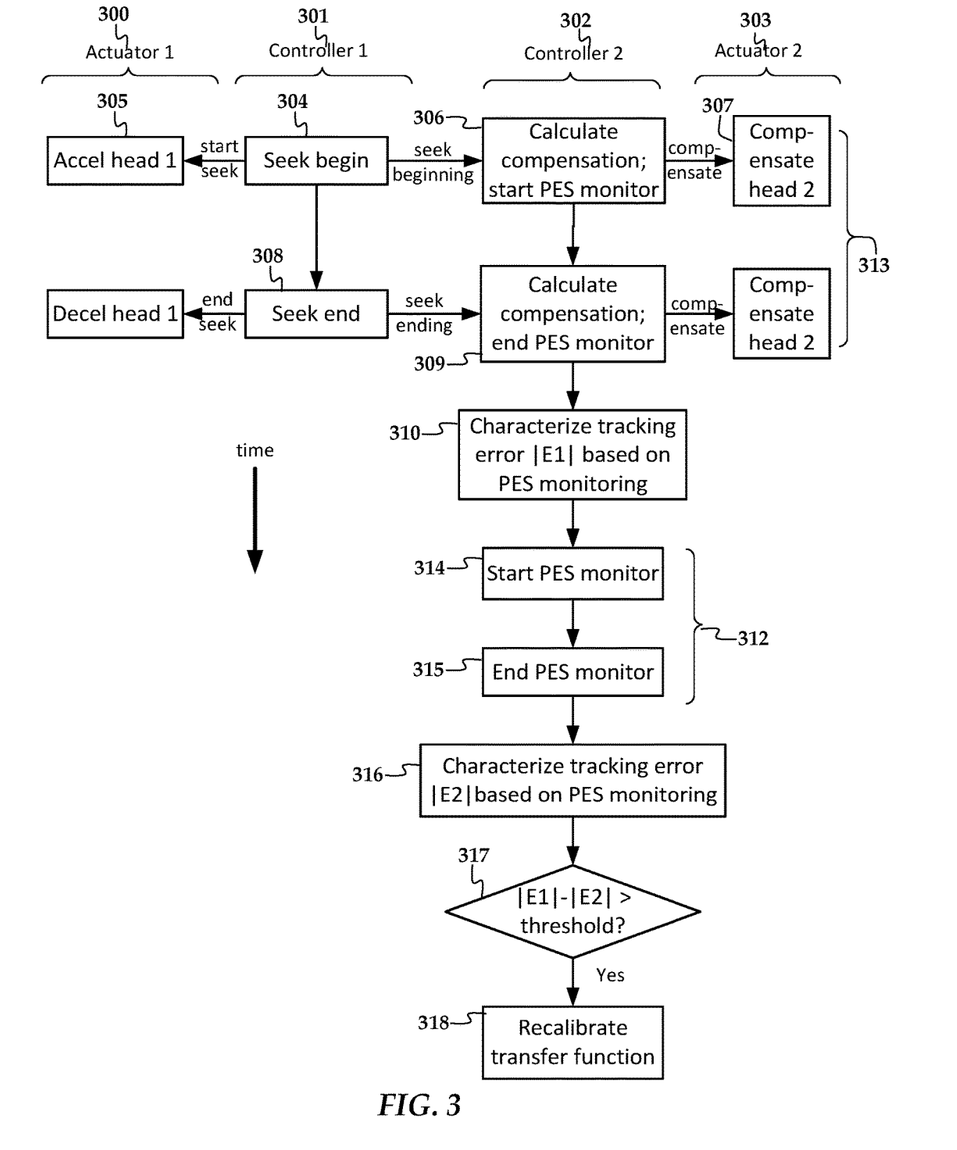
FIGS. 3 and 4 are flowcharts of procedures according to example embodiments.

To identify when coupling compensation has degraded, a drive can be made to distinguish between tracking errors due to imperfect coupling compensation and those due to other background impairments. An example of identifying degraded coupling compensation according to an example embodiment is shown in the flowchart of FIG. 3, which shows interactions between servo controllers 301, 302 and actuators 300, 303. Note that the actions being performed by one of the servo controllers 301, 302 can also be performed by the other servo controller 302, 301 at the appropriate time, and this can be repeated for additional servo controllers and actuators.

At block 304, the first servo controller 301 commands the beginning of a seek, and sends a signal to the first actuator 300 to accelerate 305. The beginning of the seek 304 is also communicated to the second servo controller 302, e.g., before or at the same time as the actuator 300 begins to accelerate. The communication of the seek 304 and other servo control actions may be made via messages, e.g., communication of a pending command queue and/or current command from the first 301 to second controller 302. In other embodiments, the electrical signals sent from the first controller 301 to the first actuator 300 may be detected by the second controller 302 and used to infer movement of the first actuator 300 in real time.

When the second servo controller 302 is made aware of actuation by the first servo controller 301, as indicated by block 306, it initiates its coupling compensation 307, which involves applying a force to the second head that counteracts and compensates for the reaction force that resulted from acceleration of the first head. The second servo controller 302 also begins monitoring tracking error, e.g., based on the position error signal (PES) generated by the second head. Part of the PES monitoring may involve starting a timer that measures a time interval 313 between when the first servo controller 301 starts the seek until after the seek ends 308 and the first actuator 300 has settled.

The second servo controller 302 monitors tracking errors (e.g., PES data) during interval 313 until the end of block 309. The PES data may be processed 310 after this point to characterize a magnitude of the tracking error during the first interval 313, which may be referred to herein as operational position errors. For example, the characterization/determination 310 of operational position errors may involve finding a cumulative value of the magnitude of position error using a sum and/or integration. Other data may be monitored/collected and processed instead of in addition to PES in blocks 306, 309, and 310. For example, off-track excursions over a threshold may be counted in the time period and used as an estimate of operational position errors.

As indicated by blocks 314, 315, the second servo controller 302 also monitors tracking error outside of these intervals (e.g., during background interval 312 in which no other servo operations are being performed) to determine a magnitude of tracking errors due to background impairments. The second servo controller 302 characterizes 316 this second tracking error measure and compares 317 the severity of tracking error during the interval 313 to the background severity at interval 312. A severity of tracking errors during the disturbance interval that is conspicuously greater than the background tracking errors indicates that the inter-actuator coupling compensation is not working as intended, and that the compensation needs to be re-calibrated 318. Generally, this recalibration 318 may involve re-characterizing the transfer function between the two actuators 300, 303.

Figure 4:
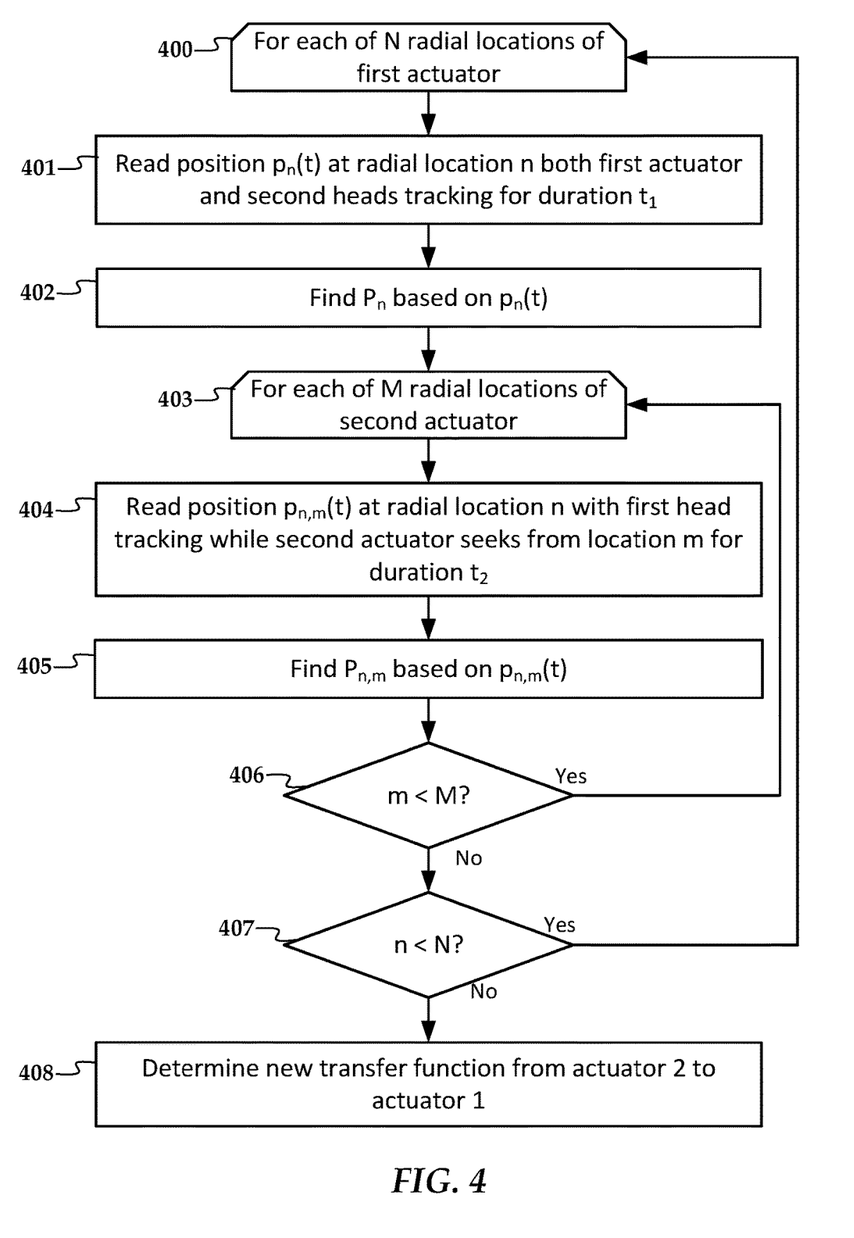

In FIG. 4, a flowchart shows a procedure used to determine a transfer function according to an example embodiment. This procedure can be performed in both the factory and in the field. In the latter case, it can be used to re-calibrate an inter-actuator coupling compensator used by one or more actuator servo controllers. Block 400 represents the beginning of a loop through N radial positions of a first actuator relative to a disk. For example, three locations may be used: one at a middle diameter and near respective inner and outer diameters of the disk. More or fewer locations may be used as required. Note that other parameters may be changed in addition to radial position of actuators, such as ambient temperature and orientation of the drive. However, because radial position is one parameter that the drive can fully control in the field, radial position is the only parameter being changed in this example.

At block 401, one or more read heads controlled by the first actuator read position (e.g., servo marks on the disk) at the current radial position while both first and second actuators are track following, given only the feedback normally available from that track, e.g., from position error signal, repeatable runout compensation, and external sensors (e.g., rotational vibration sensors). In this way, an ambient measure of position disturbance $P_n$ can be found 402 and compared to a disturbance found subsequently with the second actuator seeking. As ambient conditions can change moment to moment, the operations in blocks 401, 402 are repeated for each position n. Also, a different value of $P_n$ can be found for each head controlled by the first actuator, as each head may have a different vibration transfer function relative to the second actuator. If the heads cannot read simultaneously, blocks 401 and 402 would be repeated for each head.

Block 403 represents the beginning of a loop through M radial positions of the second actuator relative to the disk. This can be the same or different than the N locations used by the first actuator. At block 404, the one or more read heads controlled by the first actuator read position at the current radial position n while the first actuator is following a track and the second actuator seeks from location m. This may involve, e.g., performing inner diameter to outer diameter seeks, then reversing the seek direction. There may be multiple seeks using the same or different parameters. For example, one seek may be performed at the most aggressive settings available by the servo controller, and a second seek over the same distance repeated using parameters that result in a slower seek.

The reaction forces from seeking the second actuator at block 404 will create a disturbance in track position for the first heads even when the servo takes into account normal feedback mechanisms noted above, such as position error signal, repeatable runout compensation, and external sensors. A measure of position disturbance $P_{n,m}$ can be found 405 for one or more seeks. Generally, $P_{n,m}$ represents a disturbance that can't be compensated for using just the input from the normal feedback mechanisms, and further is a disturbance that is not found in blocks 401, 402.

Once all the loops have been iterated through, blocks 406 and 407 will return 'no', and the transfer function from actuator 2 to actuator 1 can be determined from the data $P_n$ and $P_{n,m}$. Note that if this same procedure also used during a qualification test or other factory procedure, then any control variables determined in the factory used to scale compensation operations can be updated based on the new results. If the factory process also developed independent scaling for other factors, such as temperature and orientation, then those scaling factors can still be applied to the control variables during operation, with the expectation that this type of scaling may still be valid even though other changes to the drive's structural properties has occurred since the scaling values were first derived.

Figure 5:
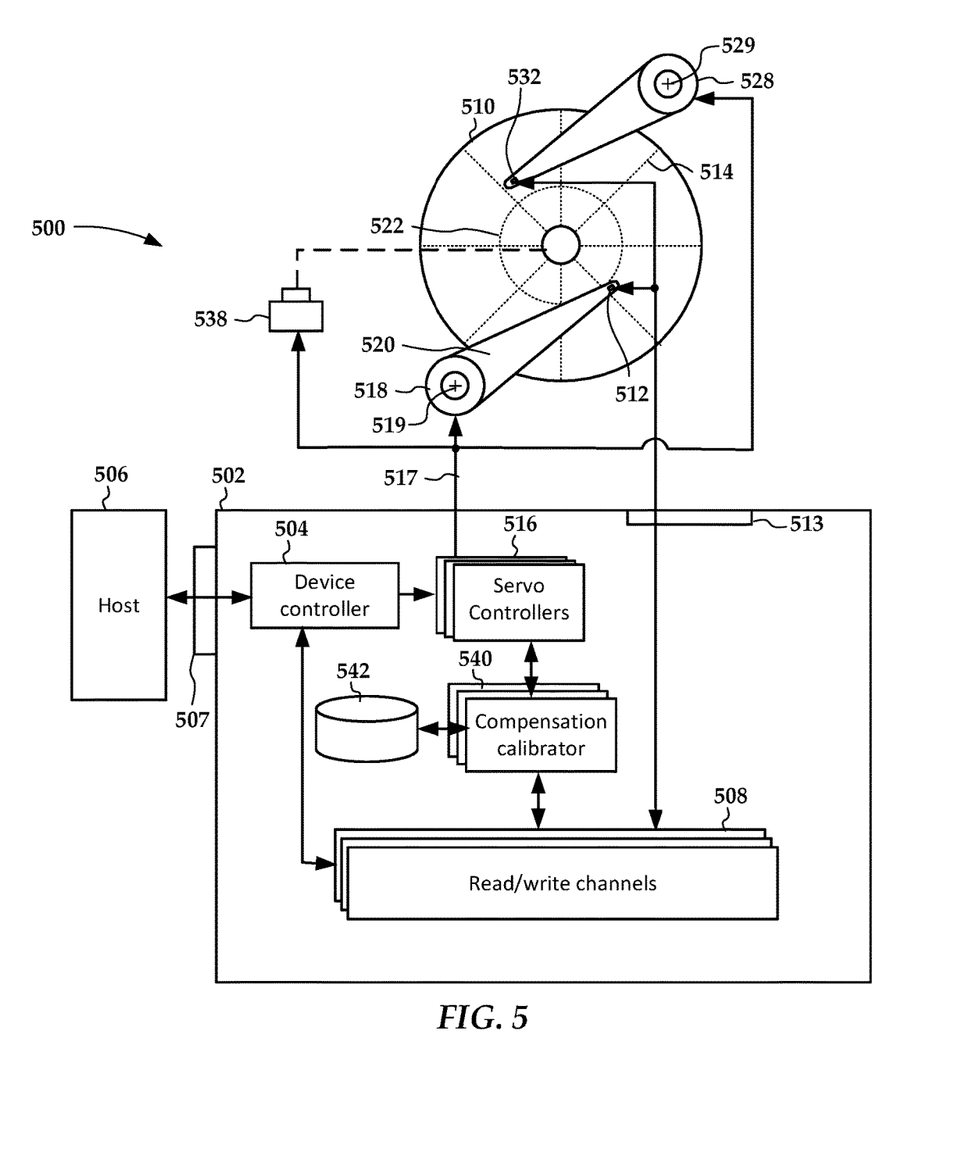
FIG. 5 is a block diagram of a disk drive apparatus according to an example embodiment.

In FIG. 5, a block diagram illustrates a data storage drive 500 that utilizes one or more actuators according to example embodiments. The apparatus includes circuitry 502 such as one or more device controllers 504 that process read and write commands and associated data from a host device 506 via a host interface 507. The host interface 507 includes circuitry that enables electronic communications via standard bus protocols (e.g., SATA, SAS, PCI, etc.). The host device 506 may include any electronic device that can be communicatively coupled to store and retrieve data from a data storage device, e.g., a computer, a server, a storage controller. The device controller 504 is coupled to one or more read/write channels 508 that read from and write to surfaces of one or more magnetic disks 510.

The read/write channels 508 generally convert data between the digital signals processed by the device controller 504 and the analog signals conducted through two or more heads 512, 532 during read operations. The two or more heads 512, 532 each may include respective read transducers capable of concurrently reading the disk 510, e.g., from the same surface or different surfaces. The read transducers may be configured to read in any mode, such as conventional single-track with single reader, or various TDMR modes like single track with multiple readers (MSMR) or multi-track with multiple readers (TDMR-MT). The two or more heads 512, 532 may also include respective write transducers that concurrently write to the disk 510. The write transducers may be configured to write using a HAMR energy source, and may write in various track configurations, such as conventional, shingled-magnetic recording (SMR), and interlaced magnetic recording (IMR). This may also include IMR tracks that are written by a HAMR drive at different widths using different laser power settings.

The read/write channels 508 may include analog and digital circuitry such as digital-to-analog converters, analog-to-digital converters, detectors, timing-recovery units, error correction units, etc. The read/write channels 508 coupled to the heads 512, 532 via interface circuitry 513 that may include preamplifiers, filters, etc. As shown in the figure, the read/write channels 508 are capable of concurrently processing one of a plurality of data streams from the multiple heads 512, 532.

In addition to processing user data, the read/write channels 508 read servo data from servo marks 514 on the magnetic disk 510 via the read/write heads 512, 532. The servo data are sent to one or more servo controllers 516 that use the data to provide position control signals 517 to one or more actuators, as represented by voice coil motors (VCMs) 518. The VCM 518 rotates an arm 520 upon which the read/write heads 512 are mounted in response to the control signals 517. The position control signals 517 may also be sent to microactuators (not shown) that individually control each of the heads 512, e.g., causing small displacements at each read/write head.

The VCM 518 may be a stacked or split actuator, in which case two VCM parts are configured to independently rotate different arms about a common axis 519. In such a case, other heads (not shown) will access data on the disks simultaneously with that of heads 512, and these other heads may be coupled to circuitry 502 similar to illustrated head 532. In other embodiments, a second actuator, e.g., VCM 528, may independently and simultaneously rotate a second arm 530 about a second axis 529. Corresponding heads 532 may be rotated by the VCM 528 and may operate simultaneously with the heads 512 under commands from the one or more servo controllers 516.

The servo controllers 516 may be configured to communicate with one another such that current or future operations of one actuator are communicated so that other servo controllers can provide compensation for other actuators, e.g., provide a control input to adjust the actuator driving force that controls the position of a read/write head in anticipation of a disturbance due to the current or future operation. The servo controllers 516 may access a common data store 542 that includes scaling factors indicative of mechanical transfer from one actuator to the other. The servo controllers 516 use these scaling factors together with the movement information communicated from other controllers 516 to determine the timing, amplitude, and/or direction of the compensation.

If it is found, e.g., through a procedure such as shown in FIG. 3, that the compensation is not as effective as it previously was (or is impairing performance), then a compensation calibrator 540 can, via the servo controllers 516, perform a series of operations (e.g., as shown in FIG. 4) to re-calibrate the compensation scaling factors and update the data stored in the data store 542. This re-calibration can be performed, e.g., as a background process when the storage drive is idle.

Figure 6:
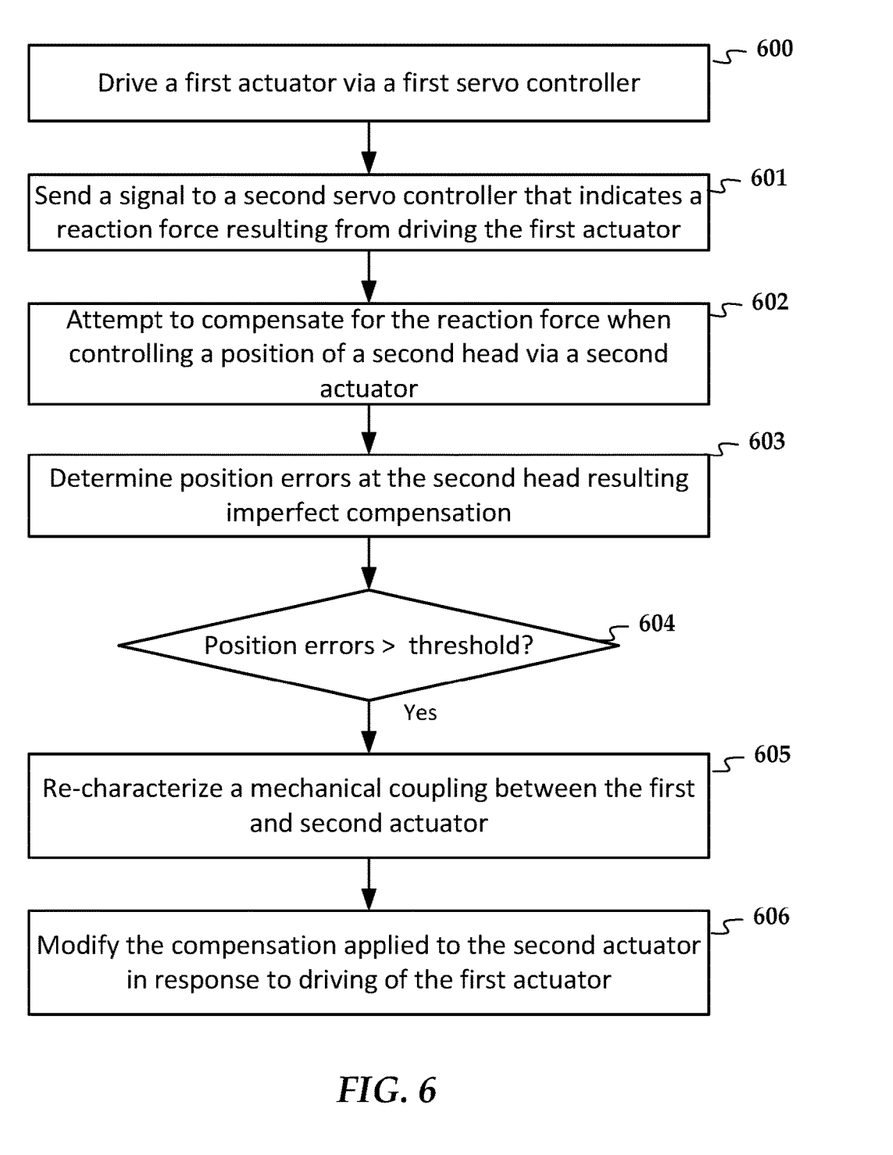
FIG. 6 is a flowchart of a method according to an example embodiment.

In FIG. 6, a flowchart shows a method according to an example embodiment. The method generally involves compensating a second head driven by a second actuator in response to driving a first actuator and first head, the driving of the first actuator disturbing the second head. The first and second heads and the first and second actuators are all within the same drive enclosure. The method involves driving 600 the first actuator which applies a reaction force on the drive enclosure in response to being driven. In response to driving the first actuator, a signal is sent 601 to a second actuator that indicates the reaction force (or an expected value of the force). This signal may be sent before or during driving the first actuator 600. The reaction force resulting from driving the first actuator is compensated for 602 when controlling a position of a second head that is moved over the one or more disks by the second actuator.

Position errors at the second head resulting from imperfect compensation for the interactuator coupling are determined 603. At block 604, the position errors are compared to a threshold. In response to the position errors exceeding a threshold, a mechanical coupling between the first and second actuator is re-characterized 605 using the first and second heads and first and second actuators, thereby obtaining an updated mechanical transfer function. Based on the re-characterization 605 of the mechanical coupling, the compensation is modified for subsequent compensation of the second actuator via the second servo controller.

Figure 7:
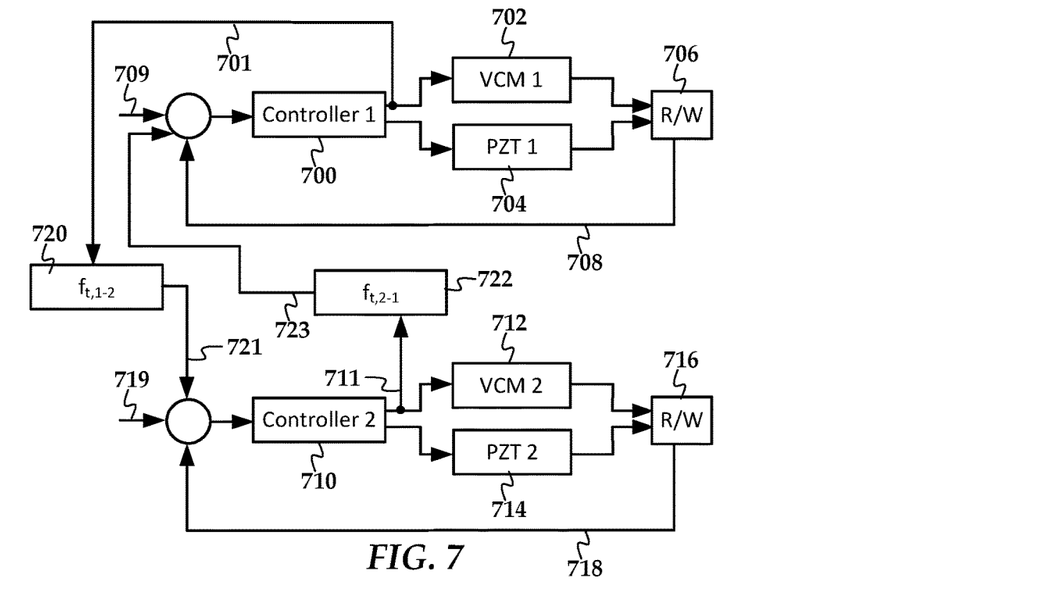
FIG. 7 is a diagram of multiple servo controllers according to an example embodiment.

In FIG. 7, a block diagram shows inter-servo compensation according to an example embodiment. Generally, a first controller 700 provides outputs to a first VCM 702 that changes the location of a first read/write head 706. In this example, the head 706 is driven by two-stage actuation, which includes a first microactuator 704 (e.g., piezoelectric actuator or PZT) that provides small displacement control of the head 706 (e.g., during track following), the first VCM 702 being used for large displacements, (e.g., during track seek)

The read/write head 706 generates a position signal 708 based on reading servo marks recording onto the disk. This position signal 708 is a feedback signal that is combined with a reference signal 709 to produce a position error signal (PES) that is input to the first controller 700. The reference signal 709 is input from the system controller (not shown) that indicates the desired placement of the read/write head 706. During tracking mode, the reference signal 709 is zero. Generally, the controller 700 uses a model of the electrical and mechanical characteristics of the system to generate the appropriate inputs to the VCM 702 and PZT 704 that will minimize PES.

A second controller 710 operates similarly with a second VCM 712, second PZT 716, second head 716, using feedback signal 718 and input signal 719. A VCM output signal 701 of the first controller 700 is also input to a transfer function 720 that scales the signal 701 to reflect an expected disturbance of the first VCM 702 on the second head 716. The output 721 of the transfer function 720 is input to the second controller 710 to compensate for the expected compensations. A VCM output signal 711 of the second controller 710 is input to a second transfer function 722 that scales the signal 711 to reflect an expected disturbance of the second VCM 712 on the first head 706. The output 723 of the transfer function 722 is input to the first controller 700 to compensate for the expected compensations. Generally, the systems and methods above can be used to modify the transfer functions 720, 722 to account for changes to the physical and electrical characteristics of the device.

Figure 8:
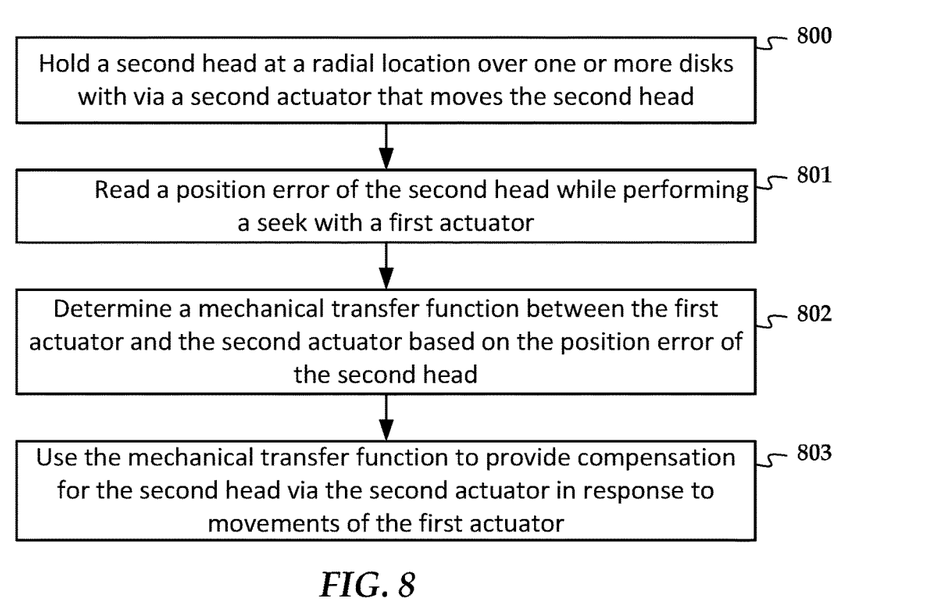
FIG. 8 is a flowchart of a method according to another example embodiment.

In FIG. 8, a flowchart shows a method according to an example embodiment. The method involves holding 800 a second head at a radial location over one or more disks via a second actuator that moves the second head. A position error of the second head is read 801 while performing a seek with a first actuator. A mechanical transfer function between the first actuator and the second actuator is determined 802 based on the position error of the second head. The mechanical transfer is used 803 to provide compensation for the second head via the second actuator in response to movements of the first actuator.

The various embodiments described above may be implemented using circuitry, firmware, and/or software modules that interact to provide particular results. One of skill in the relevant arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   holding a second head at a radial location over one or more disks via a second actuator that moves the second head;
   reading a position error of the second head while performing a seek with a first actuator, the first actuator moving a first head over the one or more disks;
   determining a mechanical transfer function between the first actuator and the second actuator based on the position error of the second head; and
   using the mechanical transfer function to provide compensation for the second head via the second actuator in response to subsequent seek of the first actuator.

2. The method of claim 1, wherein providing the compensation comprises:
   at a second servo controller that drives the second actuator, receiving a signal from a first servo controller that drives the first actuator, the signal indicating the subsequent seek of the first actuator;
   determining the compensation based on the signal and the mechanical transfer function; and
   providing an input to the second actuator via the second servo controller to compensate for a disturbance to the second head due to the subsequent seek of the first actuator.

3. The method of claim 1, further comprising:
   determining that operational position errors exceed a threshold when providing the compensation to the second head using the mechanical transfer function; and
   determining an updated mechanical transfer function responsive to the operational position errors of the second head exceeding a threshold during the compensation.

4. The method of claim 3, wherein the operational position errors exceed the threshold due to aging of a storage drive that comprises the first and second actuators, the aging of the storage drive changing the mechanical transfer function.

5. The method of claim 1, wherein the first and second actuators comprise voice coil motors.

6. The method of claim 1, wherein the compensation is applied to the second head via the second actuator in response to at least one of acceleration and deceleration resulting from the subsequent seek of the first actuator.

7. A data storage drive, comprising:
   circuitry coupled to first and second actuators and first and second heads respectively independently positioned over one or more disks of the data storage drive by the first and second actuators; and
   a controller coupled to the circuitry and operable to:
      hold the second head at a radial location over the one or more disks via the second actuator;
      read a position error of the second head while performing a seek with a first actuator;
      determine a mechanical transfer function between the first actuator and the second actuator based on the position error of the second head; and
      use the mechanical transfer function to provide compensation for the second head via the second actuator in response to subsequent seek of the first actuator.

8. The data storage drive of claim 7, wherein providing the compensation comprises:
   at a second servo controller that drives the second actuator, receiving a signal from a first servo controller that drives the first actuator, the signal indicating the subsequent seek of the first actuator;
   determining the compensation based on the signal and the mechanical transfer function; and
   providing an input to the second actuator via the second servo controller to compensate for a disturbance to the second head due to the subsequent seek of the first actuator.

9. The data storage drive of claim 7, wherein the controller is further operable to:
   determine that operational position errors exceed a threshold when providing the compensation to the second head using the mechanical transfer function; and
   determining an updated mechanical transfer function responsive to the operational position errors of the second head exceeding a threshold during the compensation.

10. The data storage drive of claim 9, wherein the operational position errors exceed the threshold due to aging of the data storage drive, the aging of the data storage drive changing the obtained mechanical transfer function.

11. The data storage device of claim 7, wherein the first and second actuators comprise voice coil motors.

12. The data storage device of claim 7, wherein the compensation is applied to the second head via the second actuator in response to at least one an acceleration and deceleration resulting from the subsequent seek of the first actuator.

13. A method, comprising:
   in response to positioning a first head over one or more disks via a first servo controller that drives a first actuator, sending a signal to a second servo controller that indicates a reaction force due to the driving of the first actuator;
   using the signal, attempting to compensate for the reaction force via the second servo controller when controlling a position of a second head over the one or more disks via a second actuator;
   determining position errors at the second head while attempting the compensation;
   responsive to the position errors exceeding a threshold, re-characterizing a mechanical coupling between the first and second actuators using the first and second heads and the first and second actuators; and
   based on the re-characterization of the mechanical coupling, modifying the compensation of the second actuator via the second servo controller for subsequent operations.

14. The method of claim 13, wherein the signal is sent to the second servo controller before the first head is positioned.

15. The method of claim 13, wherein the signal is sent to the second servo controller at the same time the first head is positioned.

16. The method of claim 13, wherein re-characterizing the mechanical coupling comprises recalibrating a mechanical transfer function between the first and second actuators, the second servo using the recalibrated mechanical transfer function for compensation of the subsequent operations in response to the signal.

17. The method of claim 13, wherein the re-characterizing of mechanical coupling between the first and second actuator comprises:
   holding the second head at a radial location over the one or more disks via the second actuator; and
   reading cumulative position errors of the second head while performing a seek with the first actuator, the mechanical coupling being re-characterized based on the cumulative position errors.

18. The method of claim 13, wherein the re-characterizing of mechanical coupling between the first and second actuator is a same procedure that is performed in a factory test of a storage drive that comprises the first and second heads, the first and second actuators, and the one or more disks.

19. The method of claim 13, wherein the first and second actuators comprise voice coil motors.

20. The method of claim 13, wherein the reaction force is due to one or more acceleration and deceleration of the first actuator.

* * * * *